United States Patent [19]
Pippert

[11] 4,219,204
[45] Aug. 26, 1980

[54] ANTI-EXTRUSION SEALS AND PACKINGS

[75] Inventor: Frederick B. Pippert, Houston, Tex.

[73] Assignee: Utex Industries, Inc., Houston, Tex.

[21] Appl. No.: 965,033

[22] Filed: Nov. 30, 1978

[51] Int. Cl.² ........................ F16J 15/22; F16J 15/32
[52] U.S. Cl. ................................ 277/188 A; 277/230;
  277/236; 277/152
[58] Field of Search ............... 277/125, 138, 152, 153,
  277/165, 168, 180, 186, 188 R, 188 A, 207 R,
  228, 230, 236, DIG. 6

[56] References Cited
U.S. PATENT DOCUMENTS

| | | | |
|---|---|---|---|
| 2,446,224 | 8/1948 | Frisby et al. | 277/188 A |
| 3,719,366 | 3/1973 | Pippert | 277/230 X |

FOREIGN PATENT DOCUMENTS

| | | | |
|---|---|---|---|
| 1321889 | 2/1963 | France | 277/188 R |
| 453550 | 9/1936 | United Kingdom | 277/236 |
| 962301 | 7/1964 | United Kingdom | 277/188 A |
| 1161529 | 8/1969 | United Kingdom | 277/188 R |

Primary Examiner—Robert S. Ward, Jr.
Attorney, Agent, or Firm—Browning, Bushman & Zamecki

[57] ABSTRACT

A seal or packing, usable in static or dynamic applications, the seal or packing having a body section, and an anti-extrusion section contiguous and, preferably bonded, to at least a portion of said body section, the anti-extrusion section being comprised of a knitted material formed from interlocked filaments or wires, at least some of which are metallic in nature.

46 Claims, 16 Drawing Figures

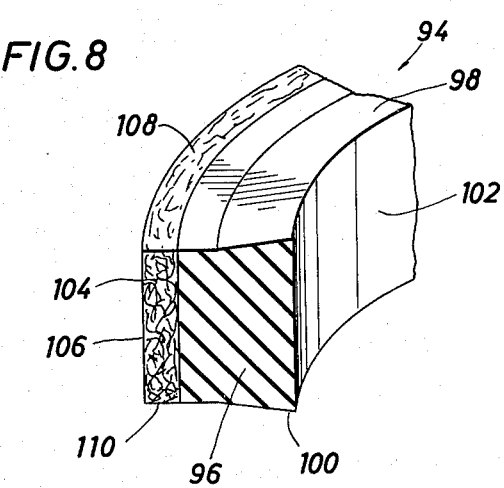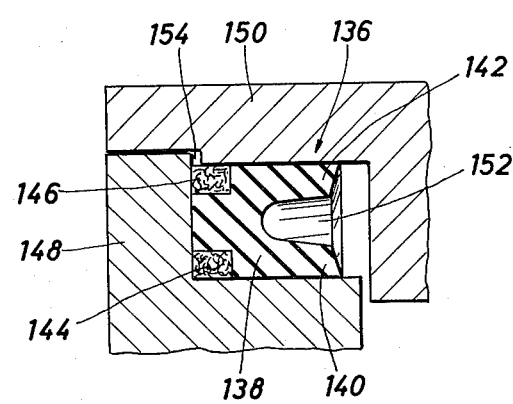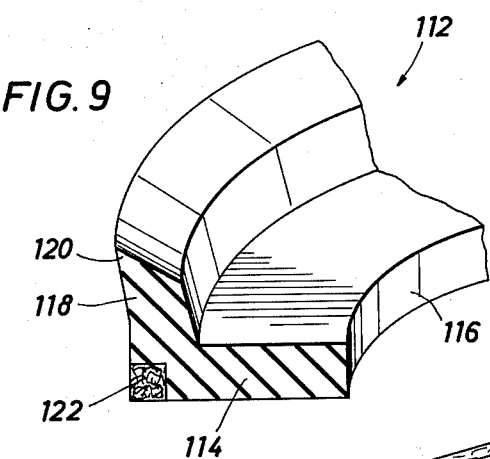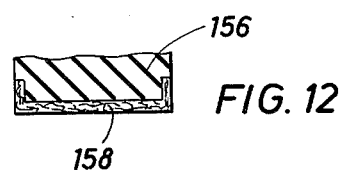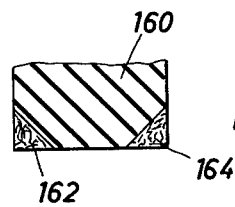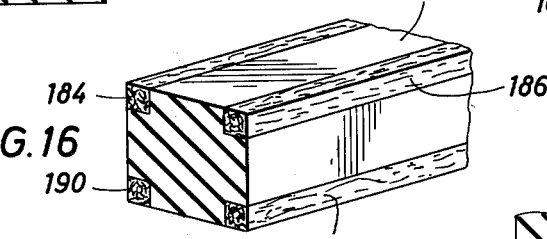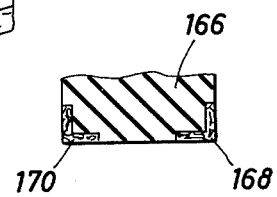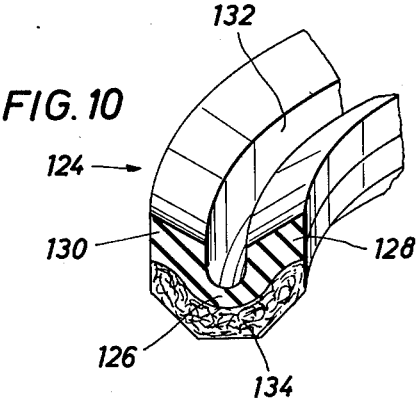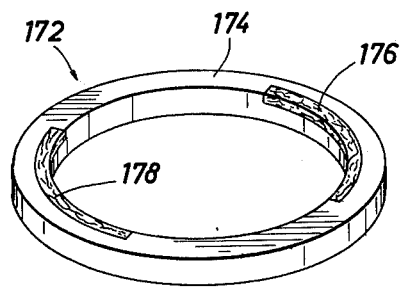

ANTI-EXTRUSION SEALS AND PACKINGS

BACKGROUND OF THE INVENTION

The present invention relates to sealing devices and, more particularly, to seals, packings and the like used in environments wherein at least a portion of the sealing device is subjected to extrusion forces.

Sealing devices, such as seals or packings, whether of the dynamic or static type, are usually made, or have portions made of materials which, to some extent, are resilient or at least deformable. In order to seal effectively, it is necessary that the sealing device be placed under some compressive loading between the components of the assembly to be sealed. Because of the compressing load, the deformable nature of at least a portion of the seal, and if the seal is subjected to sufficient pressure, there is a tendency for portions of the seal to be subjected to extrusion forces which will either distort the seal and impair its effectiveness as a seal or, in more severe cases, force portions of the seal into clearances between the components to be sealed.

In an attempt to overcome this extrusion problem, workers in the field have resorted to various techniques. One common practice employed to prevent such extrusion as, for example in a seal ring or packing used between relatively reciprocating or rotating parts, is to mount separate back-up rings or washers adjacent the seal ring, the back-up ring serving to prevent the seal ring from being extruded. These back-up rings are generally made of metal or other hard materials which generally must be machined. Another technique which has been used is shown in U.S. Pat. No. 3,094,337 wherein there are disclosed anti-extrusion seal rings in which an annulus of a relatively soft sealing material is bonded to annular sections of anti-extrusion materials such as thermosetting resins or the like.

SUMMARY OF THE INVENTION

It is therefore an object of the present invention to provide an improved ring or packing for use under severe operating conditions including, for example, high pressures, high temperatures and the like.

A further object of the present invention is to provide an improved sealing device such as a seal ring, packing or the like, incorporating anti-extrusion sections or elements formed of knitted materials incorporating at least some metallic wires or filaments.

The above and other objects of the present invention will become apparent from the drawings, the description given herein and the appended claims.

The sealing device of the present invention, in one embodiment, comprises a generally non-metallic body section. Contiguous, and preferably bonded to the body section is an anti-extrusion section or element formed from knitted materials made from interlocked filaments or wires, at least some of which are metallic in nature.

In another embodiment, the present invention contemplates a strip packing member comprised of an elongate, generally non-metallic body section. The packing is further provided with an anti-extrusion section which is bonded to at least a portion of the body section, the anti-extrusion section being formed from the knitted material described above.

BRIEF DESCRIPTION OF THE DRAWINGS

FIGS. 4–10 are transverse, cross-sectional views of various packings and seals made in accordance with the present invention.

FIG. 11 is a view similar to FIG. 3 showing a U-shaped packing made in accordance with the present invention and being used in a special seating arrangement.

FIGS. 12–14 show additional, cross-sectional views of seals and packings made in accordance with the present invention.

FIG. 15 is a perspective view of another seal made in accordance with the present invention.

FIG. 16 is a perspective view of an embodiment of the present invention in strip form.

DESCRIPTION OF THE PREFERRED EMBODIMENTS

Figure 1:
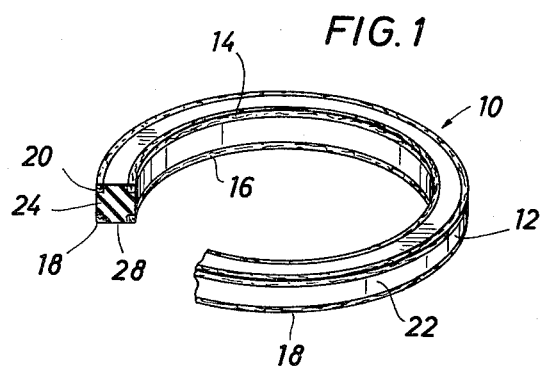
FIG. 1 is a perspective view of a packing member made in accordance with the present invention, a portion of the seal ring being broken away for purposes of illustration.
Figure 2:
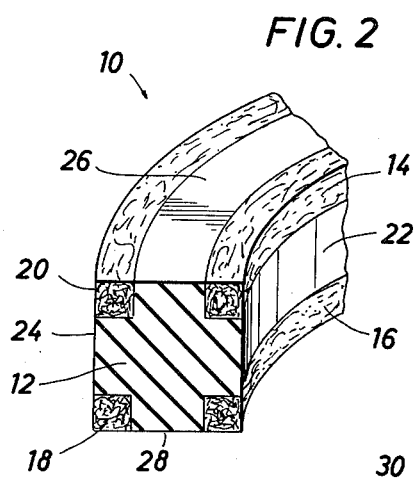
FIG. 2 is an enlarged, cross-sectional view of the packing member shown in FIG. 1.

Referring first to FIGS. 1 and 2, there is shown a typical squeeze packing 10 for use, generally, in a static application. The packing, which is generally square in cross-section (see FIG. 2) is comprised of an annular, generally non-metallic body section 12, which, as shown, is generally homogeneous in nature, and can be formed of an elastomeric or resilient material such as a rubber. Squeeze packing 10 further includes annular, anti-extrusion sections or back-up rings 14, 16, 18 and 20 bonded to and defining each of the radially inner and radially outer end corners of the packing 10. Anti-extrusion rings 14, 16, 18 and 20 are comprised of knitted material formed at least partially from metallic filaments and described in detail hereafter. The anti-extrusion rings 14, 16, 18 and 20 are generally square in cross-section and, as noted, are bonded, or otherwise integrally joined to the material forming annular body 12. The anti-extrusion rings 14, 16, 18 and 20 are spaced from one another so as to provide inner and outer cylindrical sealing surfaces 22 and 24, respectively, and annular, end sealing surfaces 26 and 28, respectively on body section 12.

Figure 3:
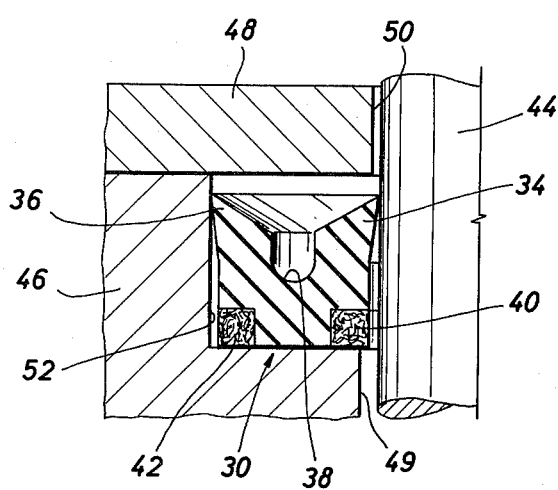
FIG. 3 is a simplified environmental view, partly in section, showing a U-shaped packing made in accordance with the present invention and used to seal around a movable shaft.
Figure 5:
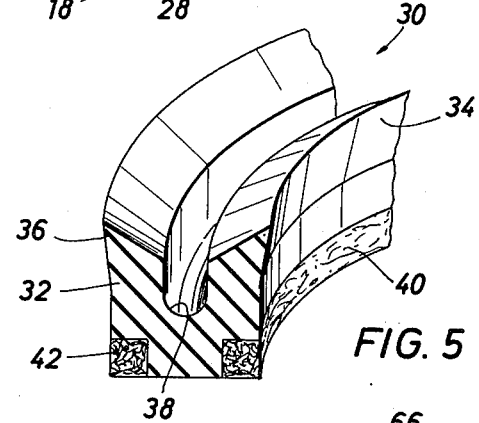

Referring now to FIGS. 3 and 5, there is shown a U-ring packing 30 constructed in accordance with the present invention and used as a seal around a movable shaft. The U-ring packing is comprised of a generally homogeneous, non-metallic annular body section 32 having radially inner and outer sealing lips 34 and 36, respectively, the lips defining an annularly extending, U-shaped groove 38 therebetween. Packing 30 is also provided with a radially innermost anti-extrusion ring 40 and a radially outermost anti-extrusion ring 42 which are bonded to body section 32 at the radially innermost and radially outermost corners axially distal radially innermost and radially outermost sealing lips 34 and 36, respectively. Anti-extrusion rings 40 and 42, which are comprised of knitted material containing metallic filaments or wires, are, generally square in cross-section.

Referring to FIG. 3, U-ring packing 30 is shown forming a seal between a movable shaft 44 and a housing 46 through which extends shaft 44. A packing gland 48 through which shaft 44 extends holds packing 30 in housing 46. Packing gland 48 is secured to housing 46 by threaded bolts (not shown) or other means well known in the art. In the embodiment shown in FIG. 3, fluid under pressure leaking between shaft 44 and packing gland 48, i.e. through annular space 50, will act on U-ring packing 30, the force exerted by the fluid pressure tending to extrude the body portion 32 of packing 30 against the cylindrical wall 52 of housing 46 and toward the annular space 49 between shaft 44 and housing 46. The presence of the anti-extrusion rings 40 and 42 prevents such extrusion and ensures that sealing lips 34 and 36 will be kept in contact with shaft 44 and cylindrical wall 52, respectively.

Figure 4:
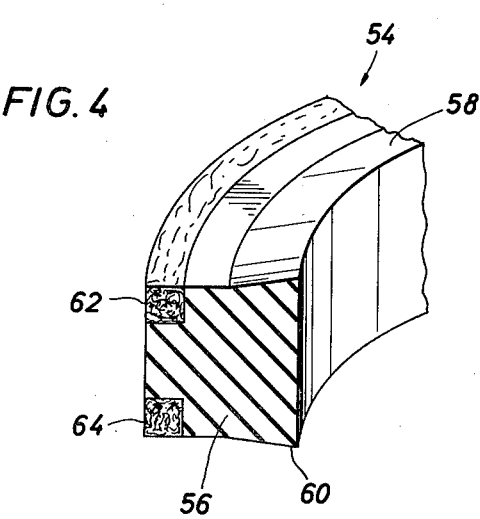

FIG. 4 shows another squeeze type packing 54 similar to that shown in FIG. 2. Squeeze type packing 54 has an annular, generally non-metallic body section 56 which has radially innermost, axially outwardly flared portions 58 and 60, portions 58 and 60 forming sealing surfaces. On the radially outermost corners of squeeze type packing 54 are anti-extrusion rings 62 and 64, ring 62 being on the same axial side as flared portion 58, ring 64 being on the same axial side as flared portion 60. Squeeze type packing 54 is a typical static type sealing device in which flared portion 58 and 60 provide sealing surfaces engageable with the surfaces of the structural members against which the packing 54 is sealing. Annular anti-extrusion sections 62 and 64, which are bonded to body section 56, are square in cross-section and are comprised of a knitted material containing metallic filaments or wires.

Figure 6:
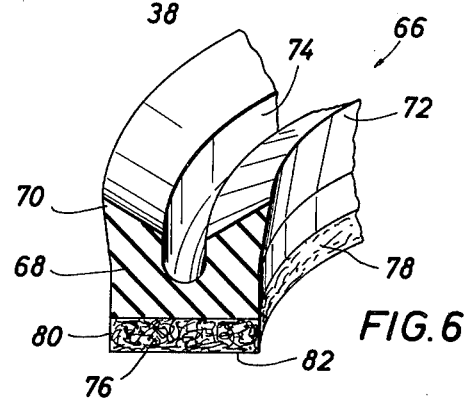

FIG. 6 shows a U-ring packing 66 similar to that shown in FIG. 5. U-ring packing 66 has an annular, generally non-metallic body section 68 adjoined to radially innermost and radially outermost sealing lips 70 and 72, respectively, an annular, U-shaped recess 74 being formed between lips 70 and 72. Bonded to and extending completely across the end surface of body section 68 axially distal groove 74 is an anti-extrusion ring 76, anti-extrusion ring 76 having a radially innermost cylindrical surface 78, a radially outermost cylindrical surface 80, and an annular surface 82. U-ring packing 76 which is rectangular in cross-section is comprised of a knitted material containing metallic filaments or wires.

Figure 7:
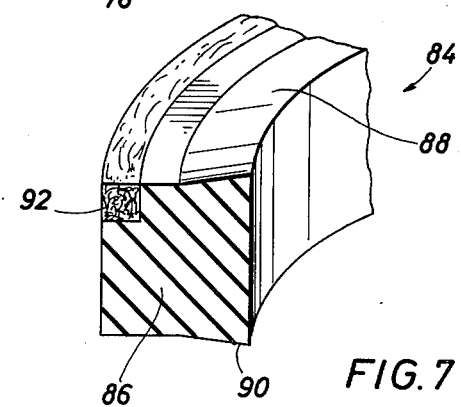

With reference to FIG. 7, there is shown a squeeze type packing 84, similar to squeeze type packing 54 shown in FIG. 4. Packing 84 has an annular, generally non-metallic body section 86 with axially spaced, radially innermost axially outwardly flared portions 88 and 90 forming sealing surfaces on body section 86. Bonded to body section 86 is an annular anti-extrusion section 92, section 92 lying generally radially outwardly from flared portion 88 and on the same axial side of squeeze packing 84. Anti-extrusion section 92 is generally square in cross-section and is comprised of a knitted material containing metallic wires or filaments.

With reference to FIG. 8, there is shown still another squeeze type packing 94 which, like packings 54 and 84 shown in FIGS. 4 and 7, respectively, has an annular, generally non-metallic body section 96 with radially innermost, axially spaced flared portions 98 and 100, flared portions 98 and 100 providing sealing surfaces on body section 96, respectively. Concentrically disposed with respect to the inner cylindrical surface 102 of body section 96 is annular, anti-extrusion section 104, section 104 being bonded to body section 96 and extending for the full axial extent thereof. Anti-extrusion section 104, which is rectangular in cross-section, has an outer cylindrical surface 106 and axially spaced annular surfaces 108 and 110, and is comprised of a knitted material formed, at least partially, by metallic filaments or wires.

FIG. 9 shows a cup packing 112 having an annular, non-metallic body section 114 defining a central circular opening 116. A sealing lip 118 is formed integrally with body section 114 and has a radially outermost sealing surface 120. Bonded to body section 114 is an annular anti-extrusion section 122, section 122 being disposed at the radially outermost corner of cup packing 112 and axially distal the extremity of lip 118. Sealing section 122 is rectangular in cross-section and is comprised of a knitted material formed, at least partially, from metallic filaments.

FIG. 10 shows a typical V-ring packing 124 having an annular, generally non-metallic body section 126 and radially innermost and outermost sealing lips 128 and 130, respectively. Body section 126 and sealing lips 128 and 130 define an annular groove 132. An annular anti-extrusion section 134 is bonded to body section 126. Anti-extrusion section 134, which is generally U-shaped in cross-section, extends across the entire radial width of V-packing 124 and forms one axial surface of V-ring packing. As in the cases above, anti-extrusion or back-up 134 is comprised of a knitted material formed, at least in part, from metallic filaments.

With reference to FIG. 11, there is shown a U-ring packing 136 similar to U-ring packing 30 shown in FIG. 5. Packing 136 has an annular, generally non-metallic body section 138 from which depend sealing lips 140 and 142. Sealing lips 140 and 142 are axially spaced and extend radially outwardly from body section 138. Annular anti-extrusion sections 144 and 146, generally square in cross-section, and comprised of a knitted material formed from metallic filaments, are bonded to and form the radially innermost, axially spaced corners of U-ring packing 136. As shown, anti-extrusion section 144 is radially inwardly displaced from sealing lip 140 while anti-extrusion section 146 is radially inwardly displaced from sealing lip 142. Packing 132 is disposed in sealing relationship between members 148 and 150. It will be apparent that anti-extrusion ring 146 serves to prevent fluid pressure which might enter annular space 152 between members 150 and 148 from extruding U-ring packing 136 into the annular space 154 between members 148 and 150.

FIGS. 12–14 show various other cross-sectional configurations of the anti-extrusion sections or back-ups which can be used as various seals and packings in accordance with the present invention. FIG. 12 shows a partial, cross-sectional view of a packing or seal in which the body section 156 is bonded to anti-extrusion section 158 which is generally U-shaped in cross-section. In FIG. 13, a body section 116 is bonded to spaced anti-extrusion sections 162 and 164 which are triangular in cross-section and define two corners of the packing. The packing shown in FIG. 14 has a body section 166 which is provided with anti-extrusion sections 168 and 167 which are L-shaped in cross-section. It is apparent that numerous different cross-sectional configurations and spacing of the anti-extrusion sections can be employed. Thus, as shown above, the anti-extrusion sections can extend across a complete surface of the seal ring or packing (FIGS. 6, 8 and 12), can be disposed only at the corners where extrusion pressures are greater (FIGS. 2, 4, 5, 7, 13 and 14) or, as will be seen hereafter, disposed in only certain, circumferentially spaced portions of the seal or packing. In the latter regard, reference is made to FIG. 15 which shows an annular seal ring 172 which might be used in a valve and which has an annular, generally non-metallic body section 174 which is generally rectangular in cross-section and is provided with anti-extrusion sections 176 and 178. Anti-extrusion sections 176 and 178 are spaced diametrically from one another across seal ring 172 and, as shown, form portions of a radially innermost corner of seal ring 172. In essence, seal ring 172 is similar to squeeze packing 84 shown in FIG. 7 with the exception that the anti-extrusion sections do not form a continuous annular section but only segments thereof. It will be appreciated that the cross-sectional configuration of anti-extrusion sections 176 and 178 can be square, triangular or any other shape which is desirable. Additionally, it will be appreciated that anti-extrusion sections having the configurations shown in FIGS. 12 and 14 could be employed on either the radially innermost or radially outermost corners of seal ring 172.

FIG. 16 shows a strip type packing member 180, generally square in cross-section, having an elongate, generally non-metallic body section 182 and anti-extrusion sections 184, 186, 188 and 190. Anti-extrusion sections 184, 186, 188 and 190 are bonded to body section 182, are generally square in cross-section and define the four corners of elongate packing member 180. In essence, elongate packing member 180 has a cross-sectional configuration the same as that of squeeze type annular packing 10 shown in FIG. 1. As in the other cases discussed above, anti-extrusion section 184, 186, 188 and 190 are comprised of a knitted material formed, at least partially, from metallic filaments or wires.

The anti-extrusion sections employed in the seals and packing of the present invention are comprised of knitted filaments or wires at least some of which, and preferably all of which, are metallic in nature. A particularly preferred type of knitted material consists of a continuous series of interlocking loops knitted in a tubular form. In forming the anti-extrusion sections, the knitted material is pre-formed into the desired volume and configuration and is then usually bonded to the seal or packing. In cases where the packing is a strip member, the anti-extrusion section is always bonded to the body section, however, in the case of annular seal rings or packings such as those described above, the anti-extrusion section(s) may take the form of an insert or back-up ring which has been formed from the knitted material and which is disposed contiguous the body section in those areas where pressures acting on the seal or packing would tend to cause extrusion of the material forming the body section. The anti-extrusion section can incorporate a binder such as an elastomeric material, or a phenolic material or some other such synthetic or natural material, either thermosetting or thermoplastic in nature, which can be admixed with the knitted material and essentially form an adhesive or binder for the knitted material. The knitted material used in forming the anti-extrusion section can be fabricated from almost any metal or metal alloy that can be drawn into a wire or filament. Typical such metals include stainless steel, aluminum, copper, brass, etc. As noted, the knitted material need not be solely of metal but can incorporate, as well as metal filaments, filaments of natural and synthetic polymers and yarns which will permit the anti-extrusion sections to be tailored to meet specific needs, mixed metallic filaments, e.g. aluminum and copper, can also be used to form the knitted material.

The material used in forming the body section and/or sealing lips when such are present, can comprise a thermoplastic material, a thermosetting material, a fabric reinforced thermosetting material, a fabric reinforced thermoplastic material, a mixed thermoplastic/thermosetting material or various combinations of the above. The term "thermosetting", as used herein, applies to those resins, generally synthetic in nature, which solidify or set on heating and can not be remelted. Non-limiting examples of such thermosetting resins include phenolics, alkyds, amino resins, polyesters, epoxies, silicones and the like. The term "thermoplastic", as used herein, applies to resins, generally synthetic in nature, that may soften by heat and then regain their original properties upon cooling. Non-limiting examples of such thermoplastic materials include nylon, polyethylene, polypropylene, cellulose and acrylic resins, polycarbonates and the like. As noted, the seals and packings can comprise a thermosetting or thermoplastic material reinforced with a fibrous material which can be in the form of a cloth or as a chopped or flocked filler. The term "fabric or fibrous material", as used herein, refers to any material obtained by weaving or other such techniques wherein the matrix consists of a lattice work or web of thread-like elements. Numerous materials fall into this class such as for example, cotton, asbestos, fiberglass, nylon, polyesters, linen, rayon and the like. Furthermore, blends of various materials such as cotton-polyester fabrics, rayon-polyester fabrics, etc. may be employed. It will also be apparent that the body section and the sealing lips, if present, can be formed of the same or different materials. It is typical, for example, to form both the body section and sealing lips of a homogeneous, relatively soft, resilient material such as natural or synthetic rubber or some other such natural or synthetic polymer.

While in the description given above and as depicted in the drawings, the seals or packings have been described with particular reference to annular members such as V or U-ring packings, cup packages, etc. or to strip packing members, it is to be understood that the invention is not so limited. Thus, it is not necessary that the generally non-metallic body section be annular in configuration. Depending on the type of usage to which the seal or packing is put, the non-metallic body section can have virtually any configuration. For example, the body section can be elliptical, square, hexagonal or virtually any other shape. Whatever its shape, the body section would be provided with an anti-extrusion section or sections disposed on the non-metallic body section at points or areas subject to high extrusion forces. In general, and except in the case of an elongate strip type packing member, the sealing device, i.e. seal, packing, gasket, etc., will generally have an opening or passageway therethrough which usually is at least partially defined by at least a portion of the body section, sealing being effected in the region generally contiguous and surrounding the opening. Thus, a sealing device having a non-annular configuration could be used as a seal between the plug or cock and the body of a plug valve to ensure that when the valve was either in the open or closed position there was no fluid leakage from the flow passage into the body of the valve in which the plug is mounted. In static applications, the sealing device could have a highly assymetrical configuration as for example in a gasket which had a first, relatively large generally solid body section attached to a second lesser volume body section which defined an opening, the opening in the gasket registering with similar openings in removably fixed parts so as to ensure sealing between the parts at this juncture. The anti-extrusion section(s) would be suitably disposed in such a gasket to withstand imposed extrusion forces.

It will be understood that the various configurations and the materials of construction of the seals and packings disclosed herein are virtually endless. Accordingly, the configurations and materials of construction depicted and discussed above are merely illustrative and are not intended in any way to limit the scope of the invention either with regard as to the type of seal or packing or to the type of construction employed.

I claim:

1. An anti-extrusion sealing device comprising:
   a generally non-metallic body section, said body section having at least one sealing surface, and
   an anti-extrusion section contiguous at least a portion of said body section, said anti-extrusion section serving to resist extrusion forces acting on said body section adjacent said anti-extrusion section, said anti-extrusion section being comprised of a knitted material, at least some of the filaments of said knitted material being metallic in nature.

2. The sealing device of claim 1 wherein there are a plurality of said anti-extrusion sections.

3. The sealing device of claim 1 wherein said anti-extrusion section is bonded to said body section.

4. The sealing device of claim 1 wherein said body section is comprised of a generally homogeneous composition.

5. The sealing device of claim 4 wherein said body section is comprised of an elastomeric material.

6. The sealing device of claim 1 wherein all of said filaments are metallic in nature.

7. The sealing device of claim 1 wherein said body section is comprised of a fabric reinforced composition.

8. The sealing device of claim 1 wherein said body section is annular.

9. The sealing device of claim 8 wherein said anti-extrusion section is annular.

10. The sealing device of claim 8 wherein there are a plurality of said anti-extrusion sections.

11. The sealing device of claim 8 wherein said anti-extrusion section is bonded to said body section.

12. The sealing device of claim 11 wherein said anti-extrusion section is annular.

13. The sealing device of claim 12 wherein there are a plurality of said anti-extrusion sections.

14. The sealing device of claim 8 wherein said body section is comprised of a generally homogeneous composition.

15. The sealing device of claim 14 wherein said body section is comprised of an elastomeric material.

16. The sealing device of claim 8 wherein all of said filaments are metallic in nature.

17. The sealing device of claim 8 wherein said body section is comprised of a fabric reinforced composition.

18. An anti-extrusion sealing device comprising:
   a generally non-metallic body section;
   at least one sealing lip section attached to said body section; and
   an anti-extrusion section contiguous at least a portion of said body section, said anti-extrusion section serving to resist extrusion forces acting on said body section adjacent said anti-extrusion section, said anti-extrusion section being comprised of a knitted material, at least some of the filaments of said knitted material being metallic in nature.

19. The sealing device of claim 18 wherein there are a plurality of said anti-extrusion sections.

20. The sealing device of claim 18 wherein said anti-extrusion section is bonded to said body section.

21. The sealing device of claim 18 wherein said body section is comprised of a generally homogeneous composition.

22. The sealing device of claim 21 wherein said body section is comprised of a generally elastomeric material.

23. The sealing device of claim 18 wherein all of said filaments are metallic in nature.

24. The sealing device of claim 18 wherein said body section is comprised of a fabric reinforced composition.

25. The sealing device of claim 18 wherein said body section is annular.

26. The sealing device of claim 25 wherein said anti-extrusion section is annular.

27. The sealing device of claim 25 wherein there are a plurality of said anti-extrusion sections.

28. The sealing device of claim 25 wherein said anti-extrusion section is bonded to said body section.

29. The sealing device of claim 28 wherein said anti-extrusion section is annular.

30. The sealing device of claim 29 wherein there are a plurality of said anti-extrusion sections.

31. The sealing device of claim 25 wherein said body section is comprised of a generally homogeneous composition.

32. The sealing device of claim 31 wherein said body section is comprised of a generally elastomeric material.

33. The sealing device of claim 25 wherein all of said filaments are metallic in nature.

34. The sealing device of claim 25 wherein said body section is comprised of a fabric reinforced composition.

35. A strip packing member comprising:
   an elongate, generally non-metallic body section, and body section having at least one sealing surface, and
   an anti-extrusion section bonded to at least a portion of said body section, said anti-extrusion section serving to resist extrusion forces acting on said body section adjacent said anti-extrusion section, said anti-extrusion section being comprised of a knitted material, at least some of the filaments of said knitted material being metallic in nature.

36. The packing member of claim 35 wherein there are a plurality of said anti-extrusion sections.

37. The packing member of claim 35 wherein said body section is generally homogeneous.

38. The packing member of claim 37 wherein said body section is comprised of an elastomeric material.

39. The strip packing member of claim 35 wherein all of said filaments are metallic in nature.

40. The strip packing member of claim 35 wherein said body section is comprised of a fabric reinforced composition.

41. The sealing device of claim 1 wherein said anti-extrusion section includes a binder, said binder serving as an adhesive for the filaments of said knitted material.

42. The sealing device of claim 18 wherein said anti-extrusion section includes a binder, said binder serving as an adhesive for the filaments of said knitted material.

43. The sealing device of claim 35 wherein said anti-extrusion section includes a binder, said binder serving as an adhesive for the filaments of said knitted material.

44. The sealing device of claim 1 wherein said anti-extrusion section is comprised of a knitted material of a continuous series of interlocking loops knitted in a tubular form, said anti-extrusion section being pre-formed into the desired volume and configuration and then bonded to said body section.

45. The sealing device of claim 18 wherein said anti-extrusion section is comprised of a knitted material of a continuous series of interlocking loops knitted in a tubular form, said anti-extrusion section being pre-formed into the desired volume and configuration and then bonded to said body section.

46. The sealing device of claim 35 wherein said anti-extrusion section is comprised of a knitted material of a continuous series of interlocking loops knitted in a tubular form, said anti-extrusion section being pre-formed into the desired volume and configuration and then bonded to said body section.

* * * * *

REEXAMINATION CERTIFICATE (307th)

United States Patent [19]

Pippert

[11] B1 4,219,204

[45] Certificate Issued Feb. 26, 1985

[54] ANTI-EXTRUSION SEALS AND PACKINGS

[75] Inventor: Frederick B. Pippert, Houston, Tex.

[73] Assignee: Utex Industries, Inc., Houston, Tex.

Reexamination Request:
No. 90/000,322, Feb. 3, 1983

Reexamination Certificate for:
Patent No.: 4,219,204
Issued: Aug. 26, 1980
Appl. No.: 965,033
Filed: Nov. 30, 1978

[51] Int. Cl.³ .................... F16J 15/22; F16J 15/32
[52] U.S. Cl. .................... 277/188 A; 277/152; 277/230; 277/236
[58] Field of Search ............. 277/125, 138, 152, 153, 277/165, 168, 180, 186, 188 R, 188 A, 205, 206 R, 207 R, 227, 228, 230, 236, DIG. 6; 29/419 R; 428/256; 92/241, 254, 258

[56] References Cited

U.S. PATENT DOCUMENTS

| | | | |
|---|---|---|---|
| 2,079,998 | 5/1937 | Millmine | 92/254 X |
| 2,656,229 | 10/1953 | Stillwagon | 309/17 |
| 2,674,644 | 4/1954 | Goodloe | 428/256 X |
| 2,679,441 | 5/1954 | Stillwagon | 277/188 R X |
| 2,761,203 | 9/1956 | De Witt | 29/419 R X |
| 2,890,918 | 6/1959 | Oldham | 92/254 X |
| 2,924,471 | 2/1960 | Poltorak et al. | 277/230 X |
| 2,987,353 | 6/1961 | Smith | 92/254 X |
| 3,009,721 | 11/1961 | Newton | 277/188 A |
| 3,094,337 | 6/1963 | Pippert et al. | 277/227 X |
| 3,719,366 | 3/1973 | Pippert | 277/230 X |

FOREIGN PATENT DOCUMENTS

| | | | |
|---|---|---|---|
| 1321889 | 2/1963 | France | 277/188 R |
| 779763 | 7/1957 | United Kingdom | 277/188 A |
| 929528 | 6/1963 | United Kingdom | 277/188 R |
| 1075111 | 7/1967 | United Kingdom | 277/188 A |
| 1161529 | 8/1969 | United Kingdom | 277/188 A |

OTHER PUBLICATIONS

Bulletin of Metal Textile Corporation; *Data For Designers;* Jun. 11, 1959, p. 1.
Bulletin M1-101A of Metex Corporation; Jan., 1977, pp. 1-16.
Application Bulletin M1-50 of Metex Corporation, Mar., 1977.

*Primary Examiner*—Robert S. Ward, Jr.

[57] ABSTRACT

A seal or packing, usable in static or dynamic applications, the seal or packing having a body section, and an anti-extrusion section contiguous and, preferably bonded, to at least a portion of said body section, the anti-extrusion section being comprised of a knitted material formed from interlocked filaments or wires, at least some of which are metallic in nature.

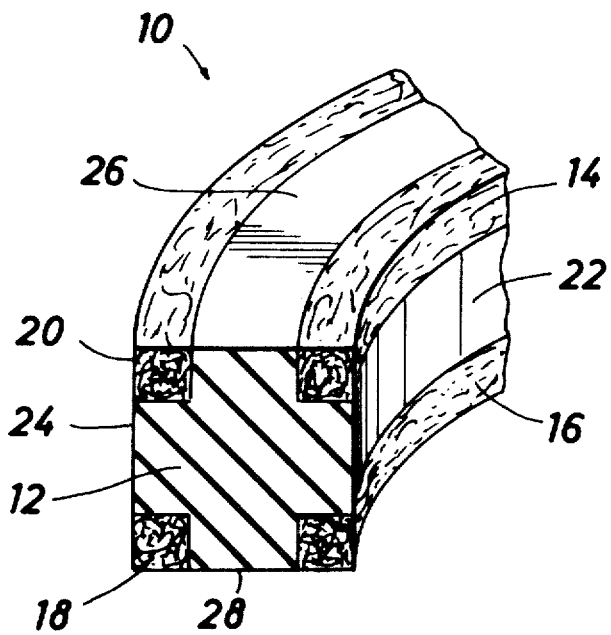

REEXAMINATION CERTIFICATE ISSUED UNDER 35 U.S.C. 307

THE PATENT IS HEREBY AMENDED AS INDICATED BELOW.

Matter enclosed in heavy brackets [ ] appeared in the patent, but has been deleted and is no longer a part of the patent; matter printed in italics indicates additions made to the patent.

AS A RESULT OF REEXAMINATION, IT HAS BEEN DETERMINED THAT:

Claims 3, 11-13, 20, 28-30 and 44-46 are cancelled.

Claims 1, 18 and 35 are determined to be patentable as amended.

Claims 2, 4-10, 14-17, 19, 21-27, 31-34 and 36-43, dependent on an amended claim, are determined to be patentable.

1. An anti-extrusion sealing device comprising:
a generally non-metallic body section, said body section having at least one sealing surface, and
an anti-extrusion section [contiguous] *bonded to* at least a portion of said body section, said anti-extrusion section serving to resist extrusion forces acting on said body section adjacent said anti-extrusion section, said anti-extrusion section being comprised of a knitted material *consisting of a continuous series of interlocking loops in tubular fashion, said knitted material being pre-formed into the desired volume and configuration prior to bonding to said body section*, at least some of the filaments of said knitted material being metallic in nature.

18. An anti-extrusion sealing device comprising:
a generally non-metallic body section;
at least one sealing lip section attached to said body section; and
an anti-extrusion section [contiguous] *bonded to* at least a portion of said body section, said anti-extrusion section serving to resist extrusion forces acting on said body section adjacent said anti-extrusion section, said anti-extrusion section being comprised of a knitted material *consisting of a continuous series of interlocking loops in tubular fashion, said knitted material being pre-formed into the desired volume and configuration prior to bonding to said body section*, at least some of the filaments of said knitted material being metallic in nature.

35. A strip packing member comprising:
an elongate, generally non-metallic body section, and body section having at least one sealing surface, and
an anti-extrusion section *bonded to said body section, said anti-extrusion section* serving to resist extrusion forces acting on said body section adjacent said anti-extrusion section, said anti-extrusion section being comprised of a knitted material consisting of a continuous series of interlocking loops in tubular fashion, said knitted material being pre-formed into the desired volume and configuration prior to bonding to said body section, at least some of the filaments of said knitted material being metallic in nature.

* * * * *